United States Patent [19]

Davancens et al.

[11] Patent Number: 5,655,264

[45] Date of Patent: Aug. 12, 1997

[54] END FASTENER FOR EYEGLASS HOLDERS

[75] Inventors: Stephen J. Davancens, Placerville; Daniel A. Phillips, Grass Valley, both of Calif.

[73] Assignee: Peeper Keepers, Inc., Shingle Springs, Calif.

[21] Appl. No.: 593,436

[22] Filed: Jan. 29, 1996

[51] Int. Cl.⁶ ............................................. A44B 21/00
[52] U.S. Cl. ............................................. 24/3.3; 24/3.1
[58] Field of Search ........................ 24/3.3, 3.1, 3.13; 224/181

[56] References Cited

U.S. PATENT DOCUMENTS

| D. 185,852 | 8/1959 | McFadyen | D17/18 |
|---|---|---|---|
| 2,539,922 | 1/1951 | Nyberg | 88/51 |
| 2,704,961 | 3/1955 | Weil | 24/3.3 |
| 2,780,853 | 2/1957 | Guthman | 24/243 |
| 3,979,795 | 9/1976 | Seron | 24/3.3 |
| 4,136,934 | 1/1979 | Seron | 351/157 |
| 4,783,164 | 11/1988 | Heiberger | 351/156 |
| 4,820,036 | 4/1989 | Seet | 351/156 |
| 4,965,913 | 10/1990 | Sugarman | 24/3.3 |
| 5,002,381 | 3/1991 | Murrell | 351/123 |
| 5,087,118 | 2/1992 | Gill | 351/156 |
| 5,092,668 | 3/1992 | Welch et al. | 351/156 |
| 5,157,425 | 10/1992 | Liu | 24/3.3 |
| 5,182,838 | 2/1993 | Stenner | 24/712.7 |
| 5,367,347 | 11/1994 | Wilson et al. | 351/156 |
| 5,414,907 | 5/1995 | Kiapos | 24/3.3 |
| 5,465,466 | 11/1995 | Napier | 24/3.3 |
| 5,500,298 | 3/1996 | Badesha | 428/411.1 |

FOREIGN PATENT DOCUMENTS 2249191  2/1991  United Kingdom ............ G02C 3/00

*Primary Examiner*—Peter M. Cuomo
*Assistant Examiner*—Stephen Vu
*Attorney, Agent, or Firm*—Millen, White Zelano & Branigan, P.C.

[57] ABSTRACT

An improved end fastener for attaching the end of an eyeglass-holder cord to a temple leg of eyeglasses includes an elongated elastomeric body having a double-tapered slot for resiliently mounting the body about a temple leg. The slot has a slotted narrow web at the narrowest location. A hole in the body holds a connector ring to connect the body to an end of the holder cord via an eyelet of a cord-end cap. Molding of the double-tapered slot includes use of two opposed, tapered cores, each disposed in a half-cavity of the mold.

12 Claims, 3 Drawing Sheets

END FASTENER FOR EYEGLASS HOLDERS

This invention relates to an end fastener for eyeglass holders and, more particularly, to an improved end fastener for attaching the end of a holder cord to a temple leg of an eyeglasses frame.

Eyeglass holders formed by a cord whose ends are attached to the temple legs of the glasses by an end fastener are known and utilized in the prior art. Conventionally, such end fasteners are affixed to the ends of a holder cord and comprise a loop or eyelet of elastic material and/or metalic spring components to resiliently grip eyeglass temple legs upon mounting thereto.

Various eyeglass holder devices are disclosed in prior art. For instance, U.S. Pat. No. 5,092,668 to Welch shows a number of features of eyeglass cord retainer apparatus. Many of these features are present in devices available in the marketplace. The Welch '668 patent discloses a securement cord with a ring formed at each end, whereby each ring is mounted to an elastomeric loop. Each elastomeric loop includes a medial spring member encompassing each loop to effect an upper and lower loop with the upper loop of each elastomeric loop resiliently securing a temple leg of an eyeglass assembly. (see FIG. 3). Typical examples of art prior to Welch et al are shown in FIGS. 1 and 2.

Sugarman (U.S. Pat. No. 4,965,913) discloses a strap for glasses. The strap includes at each end a loop 24 for holding a temple bar 12, 14.

Seet (U.S. Pat. No. 4,820,036) discloses a headband for retention of glasses. The headband has a connector end 20 that includes a slit or narrow opening 22 which may be surrounded by an enlarged recessed area 23. Connector end 20 is pushed over a temple leg to attach the headband to the glasses.

Seron (U.S. Pat. No. 4,136,934) discloses an eyeglass holder comprising an elongated strap 14. Ends 18 of strap 14 mount temple receiving and holding fixtures 20. Fixtures 20 include a tail-like projection 24 that includes an elongated slot 26 for receipt of a temple 12, 14.

Other prior art patents that include aspects of relevance to the present invention are: U.S. Pat. No. 3,979,795 (Seron); U.S. Pat. No. 2,780,853 (Guthman); and, U.S. Pat. No. 185,852 (McFadyen).

Conventional eyeglass holders or retainers are known to exhibit some undesirable and disadvantageous properties. Such undesirable attributes can be related to functional deficiencies and/or to manufacturing aspects. In regard to the latter, for instance, need for special machinery and fixturing, high labor content and/or high material cost, etc. are generally representative of disadvantageous characteristics.

Some of the prior art eyeglass holders of versions that are commonly available in the market are akin to those shown and disclosed by the Welch '668 patent. Such devices have a number of disadvantages. Loops for holding temple legs tend to lose elasticity and can thusly allow detachment of the holder cord from the temple leg. Rings, springs, adjustable collars, etc. which serve for adjustment to temple-leg size and to hold tension of the loop over the temple leg have often been found inadequate to the task; and, moreover, have added material and labor cost. They also frequently capture and pull the user's hair.

Some prior art devices, particularly those having cord-end fasteners molded in one piece or fused with ends or extension components of the cord, drastically limit the choice of cord material to only those that are not adversely affected by high-temperature molding or fusing conditions. Thus, for instance, it is difficult to fuse or heat seal leather cord effectively suitable moldable elastomeric materials; and, cords of Nylon and similar plastics are apt to melt at fusing temperatures. Additionally, rigid joining of end fasteners to cords (by fusing and otherwise) requires a relatively bulky joint region, which is undesirable both for reasons of the user's inconvenience and of material and cost.

A persistent problem associated with many, if not most conventional eyeglass holders lies with the unreliable holding capability of cord-end fasteners about eyeglass temple legs, particularly since temple legs of different types of glasses significantly differ in size and shape. Although various solutions have been disclosed, many have been found to be either ineffective in the long run or costly-particularly when used in combination with other features. For example, Guthman (2,780,853) discloses a metal spring clasp for attaching ends of a cord to eyeglass temples. This appears to be effective, but it is also a relatively high-cost solution. One-piece, molded cord-end fasteners of elastomeric material go a long way toward low cost, but they often pose problems with unadaptability to different temple sizes and with unreliability of attachment. In this respect, Seet (4,820,036) shows an end member 20 (molded in one piece with the headband) having an opening 22 through which is passed a temple leg that is to be held securely. Whereas the end member requires relatively high resiliency and elasticity to accommodate and reliably hold different-size temple legs, the headband needs substantially less resiliency and elasticity to be effective in use.

Another solution to the need for reliable holding to different size temples is disclosed by Seron (4,136,934) wherein a holding fixture 20 at the end of a band 14 includes a tail-like projection 24 with an elongated slot 26 for receipt of one of the temples. In order to provide tight gripping for differing size temples, a projection 24 is provided with a wire band 34 whose position is adjustable along projection 24 to close the slot. Again, however, adjustable collars or wire bands, etc. have often been found inadequate to the task. Moreover, they require added material and labor cost, while frequently capturing and pulling hair.

Accordingly, it is a feature of the present invention to provide a practical and functionally convenient and effective end fastener for eyeglass holders that is reliable, cost-effective, attractive, and convenient in use.

SUMMARY

In accordance with principles of the present invention, there is provided an improved end fastener for attaching the end of a holder cord to a temple leg of eyeglasses. The improved end fastener is effective, attractive, convenient to use, reliable, and relatively low in cost.

The improved end fastener of the invention includes an elongated, molded, elastomeric body for resiliently mounting the fastener about a temple leg of eyeglasses. The fastener further includes a connector-ring holder for connecting the body to an end of the cord of an eyeglass holder via a cord-end cap.

The cord-end cap comprises a substantially cylindrical tube that is hollow with one end closed—the outside of the closed end being provided with an eyelet for connecting to the connector ring. The inside of the cap serves to secure an end of the cord thereto by crimping of the cap about a cord-end, by adhesive attachment of the cord-end within the cap, by fusing of the cord-end material to the inside of the cap, or by similar processes. A connector ring holder is formed by a hole through the end-fastener body.

A means for resiliently mounting the body about a temple leg includes an elongated slot extending through the body.

The width of the slot decreases with depth to the middle of the body and, thereafter, again increases symmetrically toward the other side of the body. This double-tapered shape of the slot is achieved during molding of the body by use of two tapered, spade-like cores that protrude from the bottom of the mold cavity, one from each mold-half. Mold and cores are assembled so that the cores become components of the mold.

In a preferred embodiment, the slot includes a narrow web of material (having a slot-shaped opening) located in the middle of the body. This is achieved by provision of an appropriate step along the edge of the tip of one or both core pins. The lips formed by the web extend laterally into the slot. They are operative and particularly effective in capturing, pinching, and securely engaging temple legs that are relatively small in cross-section, but flexible enough to accommodate thicker temple legs.

The elongated and symmetrically tapered slot facilitates convenient insertion of temple legs from either side into and through the end-fastener body and provides secure engagement and attachment for temple legs of differing sizes.

A preferred method for manufacturing the elastomeric end-fastener body, in particular the elongated, double-tapered slot therein, is to mold the body in a mold of two similar half cavities, each half cavity including a tapered core that extends from wall across the half cavity. In this manner, the tips or apices of the cores meet (at the narrowest end of the tapers) when the half cavities are closed upon one another along an abutment plane. The half cavities thusly form the mold cavity ready for injection of the heated and pressurized elastomeric material. Once the elastomeric material is injected and appropriately cooled and solidified, the half cavities are drawn apart substantially along the direction of the tapered cores so that the cores withdraw from the now-molded body. The molded body can then be taken from the mold by pulling it off the tapered cores.

The assembly procedure of an eyeglass holder according to the invention includes attaching each cord-end of the eyeglass holder cord within the hollow tube end of the cord-end cap and connecting the cord-end cap to the end fastener body by means of the (open) connector ring (jump ring) that is threaded through the end cap's eyelet and through the connector hole in the end-fastener body. The connector ring is subsequently bent to a closed shape.

For use, the assembled eyeglass holder is attached to eyeglasses by pushing each end-fastener body (at each end of the assembly) with its elongated slot over one of the two temple legs of the eyeglasses into an appropriate position along the temple legs.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DESCRIPTION OF THE PREFERRED EMBODIMENTS

Figure 1:
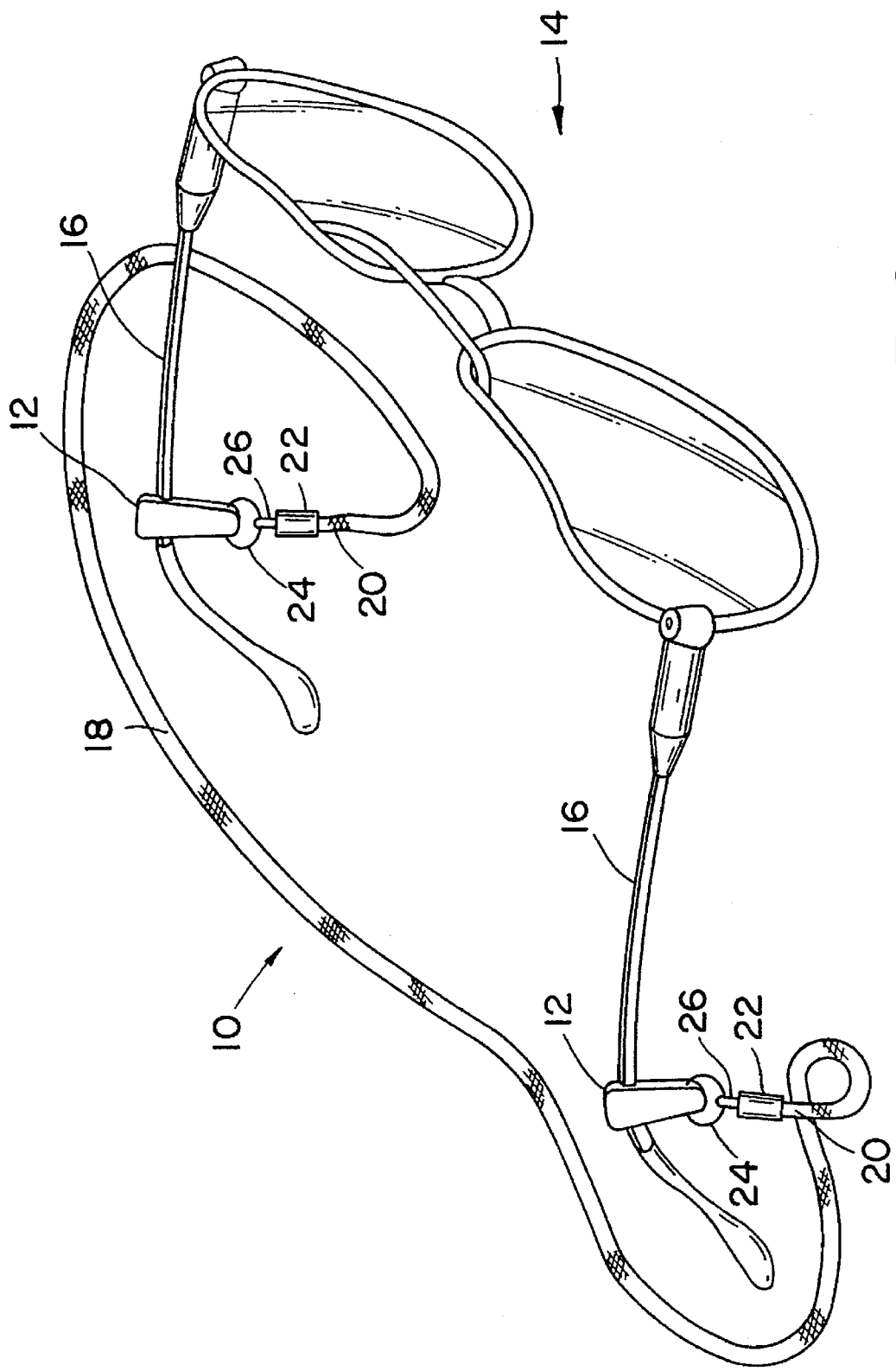
FIG. 1 is a perspective illustration of an embodiment of the device according to principles of this invention, the device being shown assembled and attached to eyeglasses.

Referring now to FIG. 1 of the drawings, there is depicted an eyeglass holder 10 including end fasteners 12 according to the invention. Holder 10 is shown attached to temple legs 16 of eyeglasses 14. Each of the temple legs 16 is inserted through and securely mounted in one of the end fasteners 12.

Eyeglass holder 10 further comprises a holder cord 18 having ends 20, cord-end caps 22, and connecting rings 24. Ends 20 are inserted into cord-end caps 22. Each cord-end cap 22 includes an eyelet 26. A connecting ring 24 couples each end fastener 12 to an eyelet 26 of a cord-end cap 22. End fasteners 12 are thusly joined and connected to the holder cord 18. Other alternate component arrangements can be used to connect between ends 20 and connecting ring 24 while utilizing the end fastener embodiments of the present invention.

Figure 2:
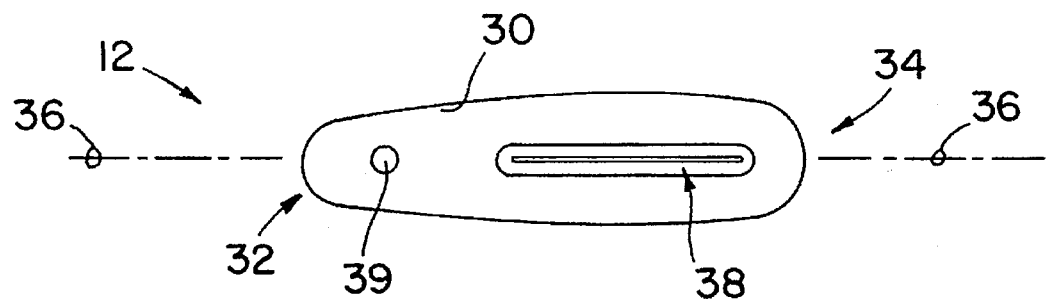
FIG. 2 is an enlarged schematic plan view of the device shown in FIG. 1.
Figure 3:
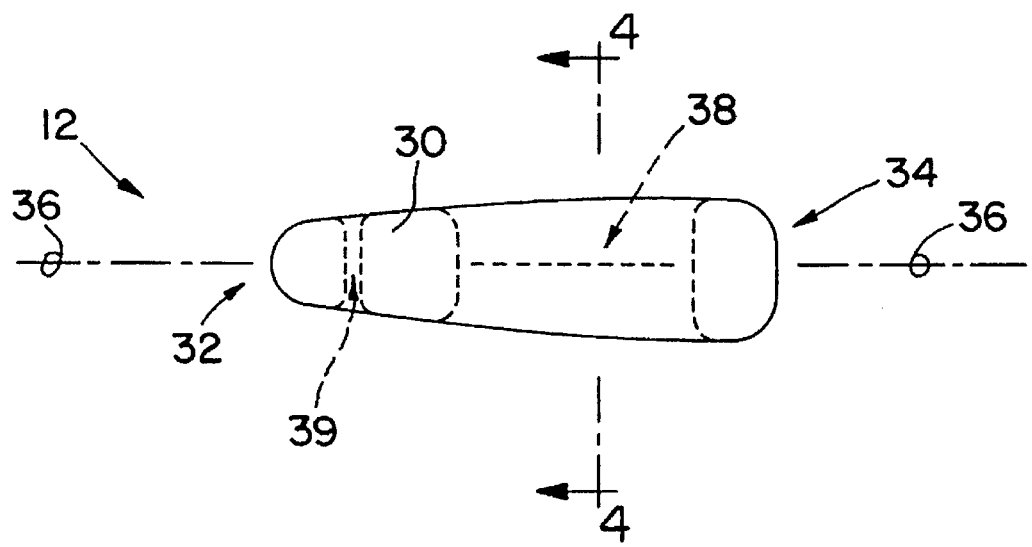
FIG. 3 is an enlarged schematic side view of the device shown in FIG. 2.
Figure 4:
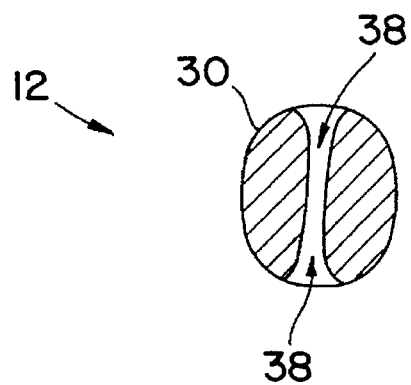
FIG. 4 is a schematic sectional view of the device shown in FIG. 3, taken along section lines 4—4.

Referring now to FIGS. 2–4, there is depicted an embodiment of the end fastener 12 in various orthogonal views. End fastener 12 comprises a body 30 of an elastomeric material that has an elongated generally obovoid shape that includes a narrow base 32 and a broad end 34. A long axis 36 is defined through centers of base 32 and end 34.

Means for securely mounting end fastener 12 resiliently over temple leg 16 is comprised in body 30 and includes a slot 38 that extends through body 30 substantially orthogonally to axis 36. Slot 38 is elongated in the direction of axis 36. As particularly apparent from FIG. 4, slot 38 has a breadth that tapers from opposite outsides of body 30 toward the middle thereof; i.e. toward the region of axis 36. This double-tapered slot 38 is operational in receiving temple leg 16 and securely holding it by virtue of the elasticity and resiliency of body 30. The double-taper shape of slot 38 facilitates easy introduction of a temple leg 16 from either side of the slot and accommodates differing cross-sectional sizes of temple legs.

Means for connecting body 30 to the end of a holder cord 18 includes a hole 39 laterally through the body at narrow base 32. As indicated in conjunction with the illustration of FIG. 1, a connecting ring 24 is employed to connect end fastener 12 (body 30) to holder cord 18 via cord-end cap 22. In assembly, connecting ring 24 is threaded through hole 39 (also through eyelet 26 of end cap 22) and is thereafter bent closed in the manner of "jump rings" in jewelry manufacture.

It should be understood that the slot 38 and particularly the taper thereof and the resulting constriction in the region of the axis 36 of the resiliently elastic body 30 are operative in nipping, squeezing, and pinching a temple leg threaded through the slot 38 to effect secure holding and retention.

Referring particularly to FIGS. 2 and 3, it can be seen that narrow base 32 has a lateral breadth that is less than the breadth in a corresponding lateral direction of broad end 34.

Figure 5:
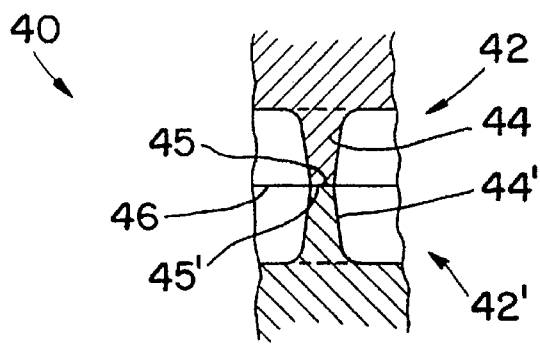
FIG. 5 is a schematic fragmental sectional view of a mold portion that relates to the part depicted in FIG. 4.

Referring now to FIG. 5, there is depicted a fragmental sectional view of a portion of a mold 40 for molding slot 38 (FIGS. 2–4). The view of FIG. 5 (mold 40) relates to the view of FIG. 4 (body 30 and slot 38). Mold 40 comprises two half cavities 42, 42' and, extending from the insides of the cavities, tapered spade-like cores 44, 44' which bridge across the cavities so that apices 45, 45' of cores 44, 44' abut. The two mold halves with half cavities 42, 42' are shown mated along abutment plain 46 to form the closed mold cavity in preparation for the molding process.

Figure 6:
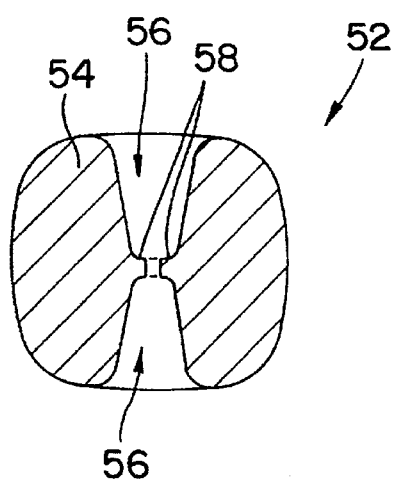
FIG. 6 is an enlarged schematic sectional view of the device in another embodiment.

Referring now to FIG. 6, there is depicted a sectional view of another embodiment of the invention. Shown here is an end fastener 52 that is similar to end fastener 12 shown in the view of FIG. 4, except that the body 54 of end fastener 52 has a slot 56 that includes lips 58. Lips 58 extend laterally from the sides of slot 56 in a substantially central region of body 54.

The slot 58 and particularly the taper thereof and the constriction effected by the lips 58 in the middle region of the resiliently elastic body 54 are operative in nipping, squeezing, and pinching a temple leg threaded through the slot 56 to effect secure holding and retention.

End fastener 52 is equally as effective in securely holding temple legs of wide cross-sections as it is in securely holding temple legs of narrow cross-sections. In this respect, the ability to accommodate a large range of sizes of temple legs is especially enhanced by the provision of lips 58. The addition of lips 58 broadens the accommodation range for differing temple-leg sizes toward those having narrower cross-sections while not curtailing the ability to securely hold large temple-leg sizes.

In respect to structure not specifically shown in FIG. 6, end fastener 52 is substantially identical to the embodiment illustrated in FIGS. 1–3 and described in conjunction therewith.

Figure 7:
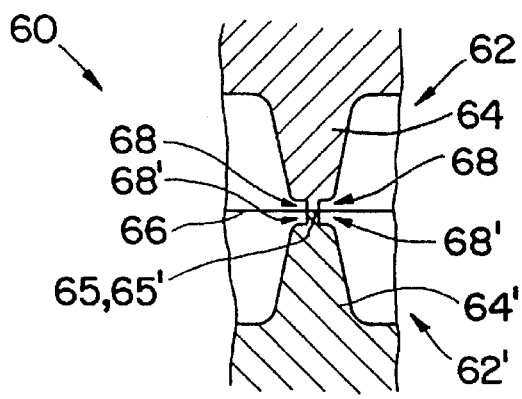
FIG. 7 is an enlarged schematic fragmental sectional view of a portion of a mold for providing the embodiment shown in FIG. 6; and, FIG. 8 is an enlarged schematic fragmental sectional view of a portion of a variation of a mold for providing the embodiment shown in FIG. 6.

Referring now to FIG. 7, there is shown a fragmental sectional view of a portion of a mold 60 for molding slot 56 shown in FIG. 6. Mold 60 comprises two half cavities 62, 62' and, extending from the insides of the cavities, tapered spade-like cores 64, 64' which bridge across the cavities so that apices 65, 65' abut. The two mold halves with half cavities 62, 62' are shown mated along abutment plain 66 to form the closed mold cavity in preparation for the molding process. Tapered cores 64, 64' include steps 68, 68', respectively, for forming of lips 58 (FIG. 6).

Figure 8:
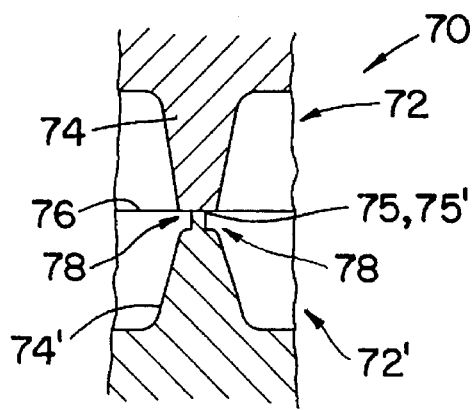

Referring now to FIG. 8, there is shown a fragmental sectional view of a portion of an alternate mold 70 for molding slot 56 shown in FIG. 6. Mold 70 comprises two half cavities 72, 72' and, extending from the insides of the cavities, tapered spade-like cores 74, 74' which bridge across the cavities. Apices 75, 75' abut. The two mold halves with half cavities 72, 72' are shown mated along abutment plain 76 to form the closed mold cavity in preparation for the molding process. In this alternate mold version, only one of the tapered cores, namely tapered core 74' includes steps 78 for forming of lips 58 (FIG. 6).

A preferred method for manufacturing the elastomeric end fastener body, in particular the elongated, double-tapered slot, is to mold the body in a mold of two similar half cavities, as described in the foregoing. Each half cavity includes a tapered core that extends from the wall across the half cavity, whereby the tips of the cores meet (at the narrowest end of the tapers) when the half cavities are closed upon one another. The half cavities thusly form the mold cavity ready for injection of the heated and pressurized elastomeric material. Once the elastomeric material is injected and appropriately cooled and solidified, the half cavities are drawn apart substantially along the direction of the tapered cores so that the cores withdraw from the now-molded body. The molded body can then be taken from the mold by pulling it off the tapered cores.

In one embodiment, the double-tapered slot includes a narrow web of material (having a slot-shaped opening) located in the middle of the body. As hereinbefore described, this is achieved by provision of an appropriate step along the edge of the tip of one or both cores. The lips 58 formed by the web extend laterally into the slot and are formed during molding of body 54 from the same elastomeric material.

In an embodiment of the invention, molding of the end fastener is preferably effected with elastomeric material having an "A" Shore hardness in the range of 30 to 62, a specific gravity in the range of 0.89 to 1.0, and a tensile strength between 750 and 1,200 psi. Molding is preferably effected at a molding material temperature between 325 and 400 degrees F. while the mold itself is heated to run in the range of 60 to 110 degrees F. Many conventional silicon elastomers are acceptable for use in the molding of the end fasteners. Alternatively, a commercially available moldable elastomer known as Krayton can be advantageously used for molding the end fastener.

While the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. An end fastener for attaching an end of an eye-glass holder cord to a temple leg of eyeglasses, the end fastener comprising:

a body of elastomeric material, said body having an elongated shape including a base and an end and having a long axis defined through the center of said base and said end, said body including means adapted for mounting said body resiliently on a temple leg, said means for mounting comprising a slot extending through said body substantially orthogonally to said axis, said slot being elongated in the direction of said axis, said slot having a breadth that tapers from an opening of the slot toward the axis running through the center of said base and said end; and, means for connecting said body at said base to said end of a holder cord;

whereby a temple leg can be threaded through said slot and can be thereby securely held to said body.

2. The end fastener according to claim 1, wherein said means for mounting further includes means adapted for pinching a temple leg, said means for pinching being located in said slot in the vicinity of said axis inside thereof.

3. The end fastener of claim 2, wherein said means for pinching includes lips extending laterally into said slot.

4. The end fastener according to claim 1, wherein said means for connecting comprises a hole extending through said body substantially orthogonally to said axis in the region of said base.

5. The end fastener of claim 4, wherein said means for connecting further comprises a jump ring that is threaded through said hole and means for coupling said jump ring to said holder cord.

6. The end fastener of claim 5, wherein said means for coupling includes a cord-end cap that fits over and about said end of a holder cord and is attachable thereto, said cord-end cap including an eyelet for engaging said jump ring.

7. The end fastener according to claim 1, wherein said base has an extent in any lateral direction that is less than the extent of said end in a corresponding lateral direction.

8. The end fastener according to claim 1, wherein said body is molded of an elastomeric material, said material having an "A" Shore hardness in the range of about 30 to 62, a specific gravity in the range of about 0.89 to 1.0, and a tensile strength between about 750 and 1,200 psi.

9. The end fastener according to claim 1, wherein said body is molded of a silicon elastomer.

10. The end fastener according to claim 1, wherein said elongated body is of a generally obovoid shape and wherein said base is more narrow than said end.

11. An end fastener for attaching an end of a holder cord to a temple leg of eyeglasses, the end fastener comprising a body having an elongated shape and including means adapted for mounting a temple leg resiliently to said body, said means for mounting comprising a slot extending through said body substantially laterally, having an opening adapted to receive a temple leg, said slot being elongated in direction along said shape, said slot tapering from the opening toward the interior of said slot, whereby a temple leg is insertable through said slot and thusly securely graspable by said body.

12. The end fastener according to claim 11, wherein said means for mounting further includes means adapted for pinching a temple leg, said means for pinching including lips located in a middle region within said body, said lips extending laterally from the sides of said slot.

* * * * *